(12) United States Patent
Fujii et al.

(10) Patent No.: US 8,823,764 B2
(45) Date of Patent: Sep. 2, 2014

(54) OPTICAL WRITER AND IMAGE FORMING APPARATUS INCLUDING SAME

(75) Inventors: Tomoya Fujii, Kanagawa (JP); Noboru Kusunose, Kanagawa (JP); Yoshinobu Sakaue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 13/425,901

(22) Filed: Mar. 21, 2012

(65) Prior Publication Data

US 2012/0300007 A1    Nov. 29, 2012

(30) Foreign Application Priority Data

May 25, 2011  (JP) .................................. 2011-117487
Jan. 27, 2012  (JP) .................................. 2012-015740

(51) Int. Cl.
  *B41J 2/435*  (2006.01)
  *B41J 27/00*  (2006.01)
  *G02B 26/12*  (2006.01)
  *B41J 2/47*   (2006.01)

(52) U.S. Cl.
  CPC .............. *B41J 2/471* (2013.01); *G02B 26/123* (2013.01)
  USPC ............ 347/263; 347/262; 347/261; 347/241

(58) Field of Classification Search
  USPC ......................................... 347/241, 261–263
  See application file for complete search history.

(56) References Cited

U.S. PATENT DOCUMENTS

2009/0214259 A1 *  8/2009  Uduki ........................... 399/151
2010/0328414 A1 * 12/2010  Takahashi ..................... 347/224

FOREIGN PATENT DOCUMENTS

| JP | 5-72457      | 3/1993  |
| JP | 11-64752     | 3/1999  |
| JP | 2001-111155  | 4/2001  |
| JP | 2002-148553  | 5/2002  |
| JP | 2003-279825  | 10/2003 |
| JP | 2006-154656  | 6/2006  |
| JP | 2006-215267  | 8/2006  |
| JP | 2006-234977  | 9/2006  |
| JP | 2006-251274  | 9/2006  |
| JP | 2006-350251  | 12/2006 |
| JP | 2007-171626  | 7/2007  |
| JP | 2008-96957   | 4/2008  |
| JP | 2008-102291  | 5/2008  |
| JP | 2009-139464  | 6/2009  |
| JP | 2010-117510  | 5/2010  |

\* cited by examiner

*Primary Examiner* — Sarah Al Hashimi
(74) *Attorney, Agent, or Firm* — Oblon, Spivak, McClelland, Maier & Neustadt, L.L.P.

(57) ABSTRACT

An optical writer includes a housing, a light source, a deflector, and a plurality of optical elements. The housing includes a plurality of surfaces, one of which includes a substantially flat portion having an opening formed therein and a curved portion curved in the shape of an arc of a circle in cross-section. The light source is enclosed within the housing and projects light through the opening and onto a target. The deflector is enclosed within the housing and deflects the light projected from the light source in a main scanning direction. The plurality of optical elements is enclosed within the housing and directs the light deflected by the deflector onto the target.

16 Claims, 11 Drawing Sheets

CURVED SHAPE
(IN SHAPE OF ARC OF CIRCLE)

LINEAR SHAPE

BOX-SHAPE

WITH RIBS

WITH CURVED PORTION

OPTICAL WRITER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2011-117487, filed on May 25, 2011, and 2012-015740, filed on Jan. 27, 2012, both in the Japan Patent Office, which are hereby incorporated herein by reference in their entirety.

BACKGROUND OF THE INVENTION

1. Field of the Invention

Exemplary aspects of the present disclosure generally relate to an image forming apparatus, such as a copier, a facsimile machine, a printer, or a multi-functional system including a combination thereof, and more particularly, an optical writer and an image forming apparatus including same.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

The optical writer employed in such image forming apparatuses illuminates and scans the image bearing member with a light beam also known as write light based on image information. The latent image is developed with toner, thereby forming a visible image, also known as a toner image.

Generally, the optical writer includes a light source that generates the light beam and optical elements that shape and direct the light beam, such as a collimating lens, a cylindrical lens, a scan lens, a reflective mirror, and a light deflector such as a polygon scanner, enclosed in an optical housing. The light source, for example, a laser diode (LD), projects the light beam, which passes through the optical elements such as the collimating lens and the cylindrical lens to shape the light beam into a desired shape. Then, the light beam strikes a polygon mirror of the polygon scanner. Subsequently, the light beam is deflected and scanned by the polygon mirror, and passes through the scan lens, the reflective mirror, and so forth. Ultimately, the light beam illuminates the image bearing member from an opening covered with a dustproof pane of glass at the bottom of the optical housing of the optical writer. The optical elements and the polygon scanner are fixed to the optical housing, which has a rectangular shape.

Typically, the polygon mirror rotates fast, causing the optical housing to vibrate. When the optical housing vibrates, the optical elements fixed to the optical housing vibrate as well, resulting in changes in the position and angle of the optical elements and hence degradation of imaging quality.

To address this difficulty, the stiffness of the bottom of the optical housing is increased by curving an entire bottom surface of the optical housing, as disclosed in JP-2002-148553-A. More specifically, in this configuration, the bottom surface of the optical housing is curved in the shape of an arc of a circle.

Although advantageous, an opening through which the light beam is projected against the latent image bearing member is formed in the curved surface of the optical housing, and the stiffness of the curved surface of the optical housing with the opening is reduced undesirably as compared with the curved surface without the opening. As a result, the curved surface of the optical housing deforms. More specifically, buckling occurs from the opening so that vibration of the optical housing cannot be suppressed.

In view of the above, there is an unsolved need for an optical housing that can suppress vibration.

BRIEF SUMMARY

In view of the foregoing, in an aspect of this disclosure, there is provided an improved optical writer including a housing, a light source, a deflector, and a plurality of optical elements. The housing includes a plurality of surfaces, one of which includes a substantially flat portion having an opening formed therein and a curved portion curved in the shape of an arc of a circle in cross-section. The light source is enclosed within the housing and projects light through the opening and onto a target. The deflector is enclosed within the housing and deflects the light projected from the light source in a main scanning direction. The plurality of optical elements is enclosed within the housing and directs the light deflected by the deflector onto the target.

According to another aspect, an image forming apparatus includes a latent image bearing member, the optical writer, and a developing device. The latent image bearing member bears a latent image. The optical writer illuminates a surface of the latent image bearing member with light to form the latent image on the surface thereof. The developing device develops the latent image with a developer to form a visible image.

The aforementioned and other aspects, features, and advantages will become more fully apparent from the following detailed description of illustrative embodiments, the accompanying drawings, and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF DISCLOSED EMBODIMENTS

Figure 1:
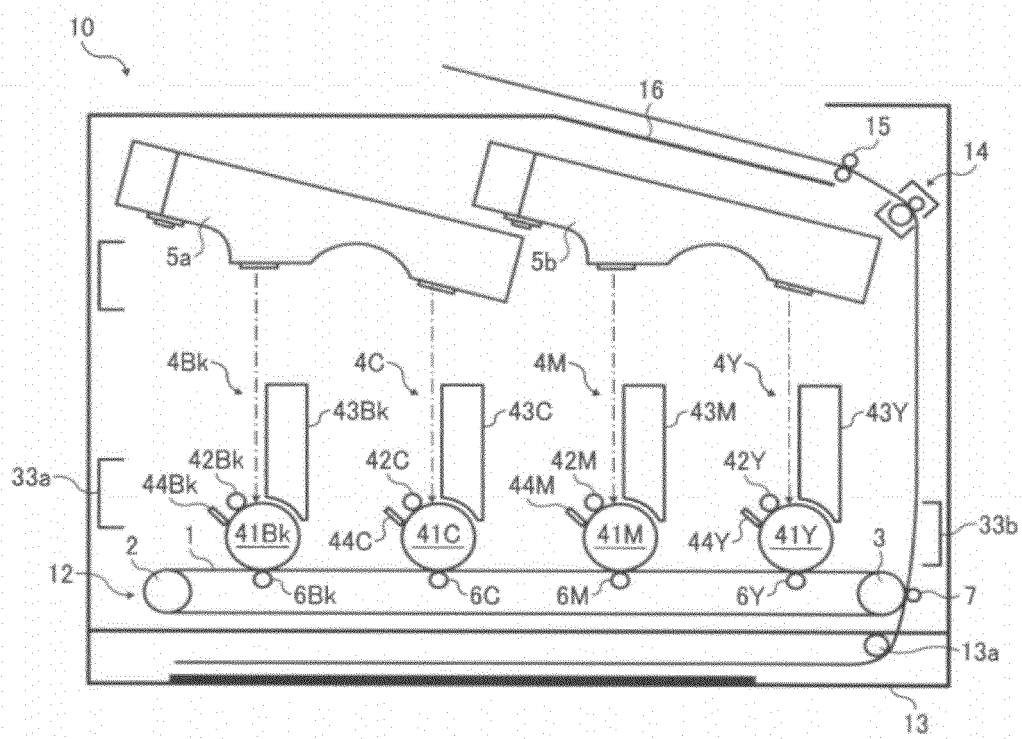
FIG. 1 is a schematic diagram illustrating a printer as an example of an image forming apparatus according to an illustrative embodiment of the present invention.

A description is now given of illustrative embodiments of the present application. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially with reference to FIG. 1, a description is provided of the optical writer according to an aspect of this disclosure. FIG. 1 is a schematic diagram illustrating a printer as an example of the image forming apparatus according to an illustrative embodiment of the present invention.

As illustrated in FIG. 1, an image forming apparatus 10 includes image forming units 4Y for yellow, 4M for magenta, 4C for cyan, and 4BK for black, a transfer device 12, a first optical writer 5a, a second optical writer 5b, and a sheet cassette 13. The transfer device 12 is equipped with a belt-type intermediate transfer member 1 (hereinafter simply referred to as intermediate transfer belt). It is to be noted that the suffixes Y, M, C, and BK denote colors yellow, magenta, cyan, and black, respectively, and to simplify the description, these suffixes Y, M, C, and BK indicating colors are omitted herein, unless otherwise specified.

The first optical writer 5a and the second optical writer 5b are arranged next to each other above the image forming units 4Y, 4M, 4C, and 4Bk such that the first optical writer 5a overlaps partially with the second optical writer 5b.

The first optical writer 5a and the second optical writer 5b convert image data after color separation provided by an external device such as a personal computer and a word processor into signals for driving respective light sources in the first optical writer 5a and the second optical writer 5b. In accordance with the signals, the light source projects a light beam.

It is to be noted that the image forming units 4Y, 4M, 4C, and 4BK all have the same configuration, differing only in the color of toner employed. Thus, a description is provided of the image forming unit 4Y as a representative example of the image forming units. The image forming unit 4Y includes a photoconductive drum 41Y surrounded by various pieces of imaging equipment, such as a charging device 42Y, a developing device 43Y, a transfer roller 5Y, a cleaning device 44Y, and so forth. The photoconductive drum 41Y has a cylindrical shape and is rotated by a driving device. The charging device 42Y charges uniformly the surface of the photoconductive drum 41Y at a certain electric potential. The charging device 42Y employs a so-called contact-charging method in which a charging roller of the charging device 42Y or the like contacts or is disposed near the photoconductive drum 41Y to charge the surface of the photoconductive drum 41Y.

It is to be noted that the charging method is not limited to the contact-charging method, and any other suitable charging method may be employed.

The photoconductive drum 41Y charged by the charging device 42Y is illuminated with a light beam projected from the second optical writer 5b, thereby forming an electrostatic latent image corresponding to the image information on the surface of the photoconductive drum 41Y. Similar to the photoconductive drum 41Y, the photoconductive drum 41M charged by the charging device 42M is illuminated with a light beam projected from the second optical writer 5b, thereby forming an electrostatic latent image corresponding to the image information on the surface of the photoconductive drum 41M. Similarly, the photoconductive drums 41 BK and 41C charged by the charging device 42BK and 42C, respectively, are illuminated with a light beam, projected from the first optical writer 5a, thereby forming an electrostatic latent image corresponding to the image information on each of the photoconductive drums 41BK and 41C.

Subsequently, the electrostatic latent image formed on the photoconductive drum 41Y is developed with yellow toner by the developing device 43Y, thereby forming a visible image, known as a toner image of the color yellow. According to the present illustrative embodiment, the developing device 43Y employs a so-called contactless developing method in which the developing device 43Y supplies toner to the electrostatic latent image on the photoconductive drum 41Y without contacting the photoconductive drum 41Y. Similar to the developing device 43Y, the developing devices 43M, 43C, and 43BK employ the contactless developing method to develop the electrostatic latent images on the photoconductive drums.

The cleaning device 44Y removes foreign substances and residual toner remaining thereon after transfer of the toner image. The cleaning device 44Y includes a brush that contacts and cleans the surface of the photoconductive drum 44Y.

As illustrated in FIG. 1, the transfer device 12 is disposed below the image forming units 4Y, 4M, 4C, and 4BK. The transfer device 12 includes the intermediate transfer belt 1, a tension roller 2, four primary transfer rollers 6Y, 6M, 6C, and 6BK, a secondary transfer roller 7, a secondary transfer counter roller 3, and a belt cleaner (not illustrated). The intermediate transfer belt 1 is formed into a loop and rotated endlessly in the counterclockwise direction.

The sheet cassette 13 is disposed below the transfer unit 12. The sheet cassette 13 stores a stack of multiple recording media sheets. The sheet cassette 13 includes a sheet feed roller 13a that contacts a top sheet of the stack of the recording media sheets and rotates in the counterclockwise direction at certain times to send it to a sheet passage in the image forming apparatus 10.

Toner images formed on the photoconductive drums 41Y, 41M, 41C, and 41 BK are transferred onto the intermediate transfer belt 1 by the transfer rollers 6Y, 6M, 6C, and 6BK, respectively, such that they are superimposed one atop the other, forming a composite color toner image. The composite color toner image is transferred onto a recording medium by the secondary transfer roller 7.

The recording medium on which the composite color toner image is transferred is transported to a fixing device 14 in which heat and pressure are applied to the composite color toner image on the recording medium to fix the composite color toner image thereon. The fixing device 14 is disposed downstream in the direction of transport of the recording medium. After the fixing process, the recording medium is discharged onto a sheet output tray 16 by a pair of sheet discharge rollers 15.

Figure 2:
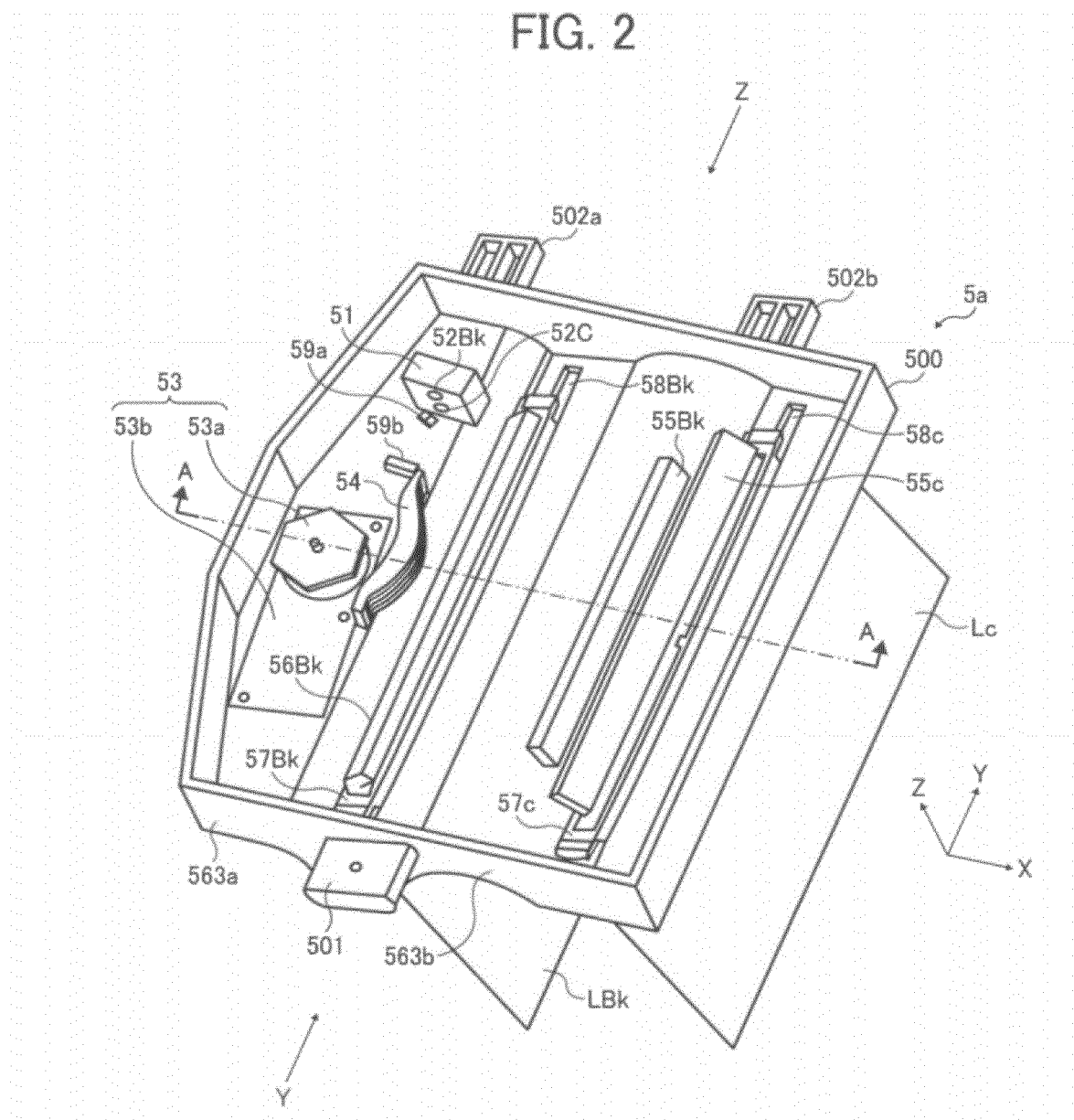
FIG. 2 is a perspective view schematically illustrating a first optical writer employed in the image forming apparatus of FIG. 1 according to an illustrative embodiment of the present invention.
Figure 3:
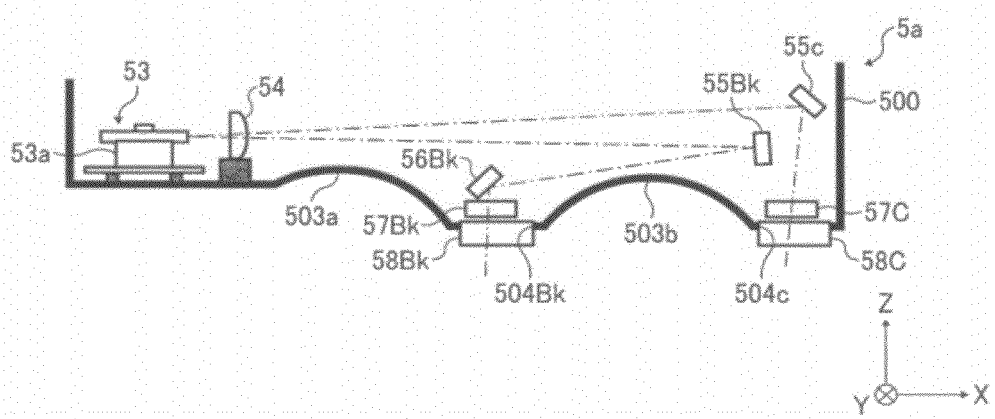
FIG. 3 is a cross-sectional view schematically illustrating the first optical writer along a line A-A in FIG. 2.

With reference FIGS. 2 and 3, a description is provided of the first optical writer 5a. FIG. 2 is a perspective view schematically illustrating the first optical writer 5a according to an illustrative embodiment of the present invention. FIG. 3 is a cross-sectional view schematically illustrating the first optical writer 5a along a line A-A in FIG. 2. It is to be noted that the first optical writer 5a and the second optical writer 5b employ the same configuration. Thus, a description is provided of the first optical writer 5a as a representative example of the optical writer.

The first optical writer 5a and the second optical writer 5b are tilted, parallel to the angle of the sheet output tray 16. The first optical writer 5a and the second optical writer 5b partially overlap as viewed from the sheet discharge side of the image forming apparatus 10, thereby reducing the size of the image forming apparatus as a whole. It is to be noted that the first optical writer 5a and the second optical writer 5b need not be tilted so as to partially overlap. However, for the sake of overall size reduction of the image forming apparatus 10, in the present embodiment the first optical writer 5a and the second optical writer 5b are tilted and partially overlap.

The first optical writer 5a includes an optical housing 500 in which an LD unit 51, a polygon scanner 53, a scanning lens (i.e. fθ lens) 54, reflective mirrors 55C, 55BK, and 56BK, cylindrical lenses 57BK and 57C, and so forth are housed. The optical housing 500 has a box-like shape with an open, exposed top. The opening at the top of the optical housing 500 is covered with a cover 503 (shown in FIG. 4) to prevent foreign substances such as dust from getting inside the optical housing 500. The LD unit 51 and the polygon scanner 53 are disposed at one side of the optical housing 500. The optical housing 500 is made of thermoplastic resin containing glass fiber. The bottom surface and four sides of the housing are molded into one piece.

The LD unit 51 includes the light source 52BK and the light source 52C. The light source 52BK comprises a semiconductor laser diode or the like to project a light beam LBK against the photoconductive drum 41BK. Similarly, the light source 52C comprises a semiconductor laser diode or the like to project a light beam LC against the photoconductive drum 41C. In the LD unit 51, the light source 52BK and the light source 52C are mounted such that a light flux projected from the light source 52BK for black and a light flux projected from the light source 52C for cyan strike the same place on the polygon mirror 53a.

As illustrated in FIG. 2, the polygon scanner 53 serving as a deflector includes the polygon mirror 53a in the shape of a regular polygonal prism, a polygon motor (not shown), and a circuit board 53b. The circuit board 53b includes electronics to control operation of the polygon motor. The polygon scanner 53 is fastened to one end portion of the bottom surface of the optical housing 500 with screws. The six sides of the polygon mirror 53a comprise reflective mirror surfaces. It should be noted that although according to the present illustrative embodiment, the polygon mirror 53a is a regular polygonal prism having 6 reflective mirror side surfaces, the polygon mirror 53a is not limited to this configuration.

The light flux (divergence light flux) projected from the light source 52BK is collimated into a parallel light flux by a collimating lens 59a disposed on an optical path between the LD unit 51 and the polygon scanner 53, and passes through a cylindrical lens 59b. After passing through the cylindrical lens 59b, the light flux is focused in the sub-scanning direction (equivalent to a surface moving direction of the photoconductive drum 41) and strikes the polygon mirror 53a. Subsequently, the light flux striking the polygon mirror 53a is reflected by the mirror surfaces of the polygon mirror 53a rotated by the polygon motor, thereby deflecting the light flux in the main scanning direction (corresponding to an axial direction on the surface of the photoconductive drum 41).

The scanning lens 54 converts the moving speed of the light flux deflected in the main scanning direction at a constant angular velocity by the polygon mirror 53a into a constant speed. Then, as illustrated in FIG. 3, the light flux is reflected by the first reflective mirror 55BK and the second reflective mirror 56BK, accordingly. After a face tangle error of the mirror surface of the polygon mirror 53a is corrected by the cylindrical lens 57BK, the light flux passes through a dust proof glass panel 58BK covering an opening 504BK formed in the bottom surface of the optical housing 500, thereby scanning the surface of the photoconductive drum 41 BK.

Similar to the light flux projected from the light source 52BK, the light flux projected from the light source 52C fixed to the LD unit 51 passes through the plurality of optical elements such as a collimating lens and a cylindrical lens and strikes the same position of the polygon mirror 53a as the light flux for black. Subsequently, the light flux for cyan is reflected by the mirror surfaces of the polygon mirror 53a rotated by the polygon motor, passing through the scanning lens 54, striking the first reflective mirror 55C, passing through the cylindrical lens 57C, and a dust proof glass panel 58C, and then scanning the surface of the photoconductive drum 41C.

According to the present illustrative embodiment, the first optical writer 5a employs one scanning lens 54. However, the number of scanning lenses is not limited to one, and one scanning lens may be provided for each color, black, and cyan. As the scanning lens 54, a scanning lens having a power in the sub-scanning direction may be employed. In this configuration, the cylindrical lenses 57BK and 57C may be eliminated.

Figure 4:
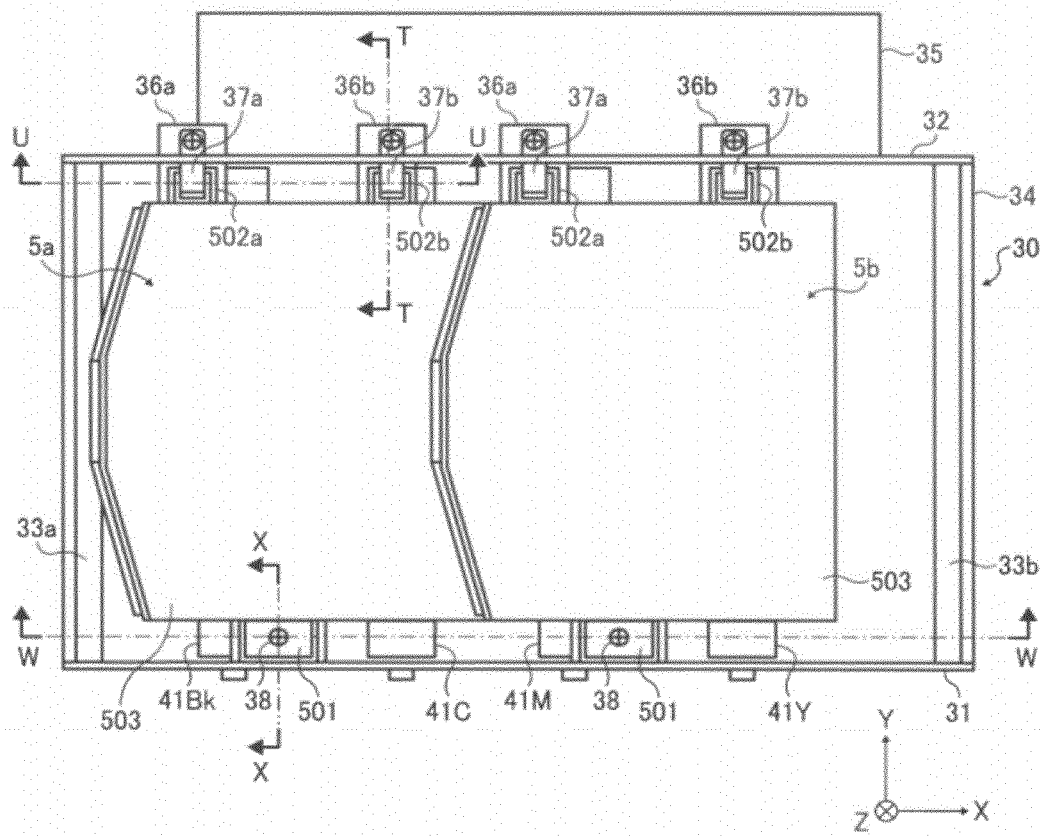
FIG. 4 is a top view schematically illustrating the image forming apparatus without exterior components such as a sheet output tray.
Figure 5:
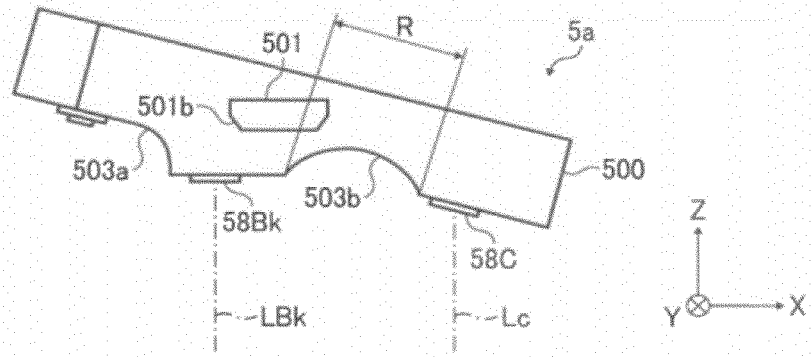
FIG. 5 is a schematic diagram illustrating an optical housing of the first optical writer as viewed along arrow Y in FIG. 2.
Figure 6:
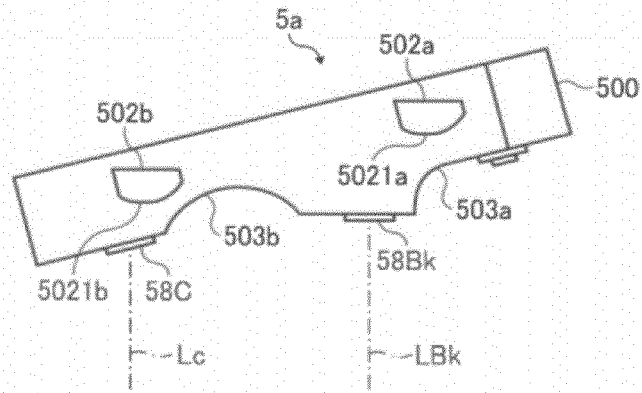
FIG. 6 is a schematic diagram illustrating the optical housing of the first optical writer as viewed along arrow Y in FIG. 2.

With reference to FIGS. 4 through 6, a description is provided of installation of the first optical writer 5a in the image forming apparatus 10. It is to be noted that the first optical writer 5a and the second optical writer 5b are mounted in the image forming apparatus 10 in the same manner. Thus, hereafter, a description is provided of the first optical writer 5a.

FIG. 4 is a top view schematically illustrating the image forming apparatus 10 without exterior components such as the sheet output tray 16. FIG. 5 is a schematic diagram illustrating the first optical writer 5a as viewed along arrow Y in FIG. 2. FIG. 6 is a schematic diagram illustrating the first optical writer 5a as viewed along arrow Z in FIG. 2.

As illustrated in FIG. 4, a main body housing 30 of the image forming apparatus 10 includes a front board 31 (at the bottom in FIG. 4), a rear board 32 (at the top in FIG. 4), a bottom board 34, and a pair of stays 33a and 33b. The front board 31, the rear board 32, the bottom board 34, and the pair of stays 33a and 33b may be separate individual parts connected together to constitute the main body housing 30. Alternatively, the front board 31, the rear board 32, the bottom board 34, and the pair of stays 33a and 33b may be constituted as a single molded part.

Each of the front board 31, the rear board 32, the bottom board 34, and the pair of stays 33a and 33b is formed of a metal planar member or resin. Between the front board 31 and the rear board 32, the first optical writer 5a and the second optical writer 5b, the image forming units 4Y, 4M, 4C, and 4BK, and the transfer unit 12 are disposed. A driving unit 35 is attached to the rear board 32. The driving unit 35 includes a motor and a gear for moving the photoconductive drums 41Y, 41M, 41C, and 41 BK, and the intermediate transfer belt 1.

As illustrated in FIGS. 5 and 6, the optical housing 500 includes a front fixing member 501 (shown in FIG. 5), a first rear fixing member 502a, and a second rear fixing member 502b (shown in FIG. 6). The front fixing member 501 projects substantially from the center of the surface of a wall of the optical housing 500 facing the front board 31 of the main body housing 30. The first and the second rear fixing members 502a and 502b project from each end of the surface of a wall of the optical housing 500 facing the rear board 32. As will be described in detail later, the front fixing member 501 facing the front board 31 is fastened to the front board 31 with a screw. As illustrated in FIG. 4, the first and the second rear fixing members 502a and 502b facing the rear board 32 are fixed to the rear board 32 using leaf springs 37a and 37b.

Figure 7:
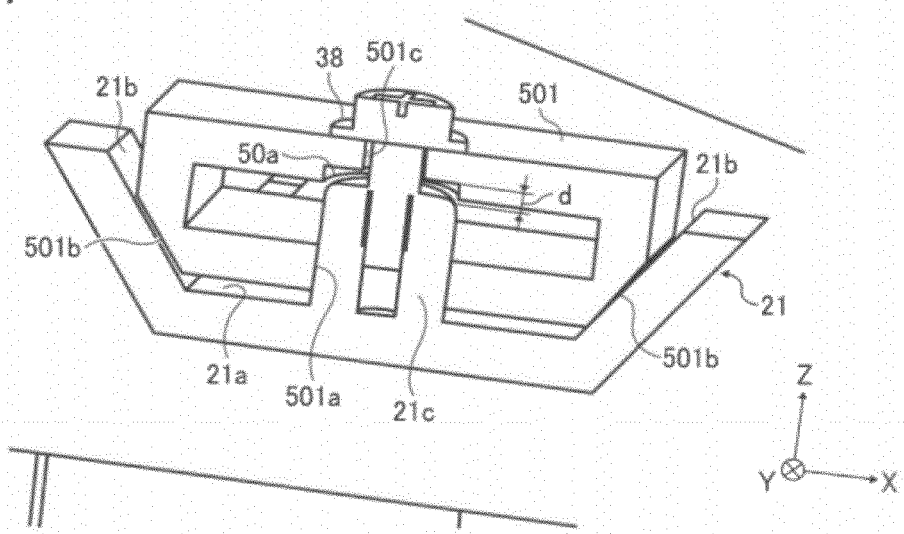
FIG. 7 is a cross-sectional view schematically illustrating a front fixing member of the optical housing and a front support member of a main body housing of the image forming apparatus along a line X-X in FIG. 4.
Figure 8:
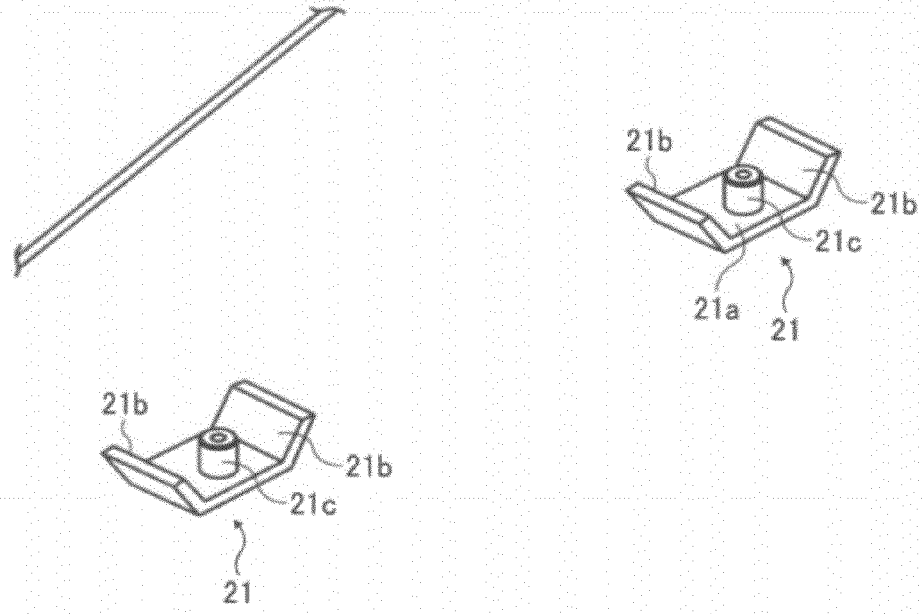
FIG. 8 is a perspective view schematically illustrating the front support member of FIG. 7.

With reference to FIGS. 7 and 8, a description is provided of fixation of the optical writer 5a at the front board 31 side.

FIG. 7 is a cross-sectional view schematically illustrating the front fixing member 501 and a front support member 21 of the front board 31 of the main body housing 30 along a line X-X in FIG. 4. FIG. 8 is a perspective view schematically illustrating the front support member 21. The front fixing member 501 of the optical housing 500 is fixed to the front support member 21.

As illustrated in FIGS. 7 and 8, the front support member 21 projects from the front board 31 towards the rear board 32 and includes a base portion 21a extending in the direction of X axis or the horizontal direction and a slanted portion 21b extending obliquely from each end of the base portion 21a in the direction of Z axis or the vertical (height) direction. The base portion 21a includes a boss 21c with a screw hole.

As illustrated in FIG. 7, the front fixing member 501 fixed to the front side of the main body housing 30 has a substantially square tubular shape having some width in the direction of X axis. A hole 501a through which the boss 21c is inserted is formed in the bottom portion of the front fixing member 501. The front fixing member 501 includes a curved surface 501b to contact the slanted portion 21b of the front support member 21. A screw hole 501c through which a screw 38 is inserted is formed in the upper surface of the front fixing member 501.

As the boss 21c formed on the base portion 21a of the front support member 21 is inserted into the hole 501a of the front fixing member 501 of the optical housing 500, the front fixing member 501 is placed on the front support member 21, and the curved surface 501b of the front fixing portion 501 contacts the slanted portion 21b of the front support member 21. As the curved surface 501b of the front fixing portion 501 contacts the slanted portion 21b of the front support member 21, the front fixing member 501 is positioned in place in the directions of X axis and Z axis relative to the main body housing 30. In the meantime, as the boss 21c of the base 21a of the front support member 21 is inserted into the hole 501a of the front fixing member 501, the front fixing member 501 is positioned in place in the direction of Y axis relative to the main body housing 30.

The front fixing member 501 is fixed to the front support member 21 by inserting the screw 38 into the screw hole 501c of the front fixing member 501 positioned in place relative to the main body housing 30 and then into the screw hole of the boss 21c. As illustrated in FIG. 7, in order to provide a space having a distance d between the boss 21c and an inner surface of the upper portion of the front fixing member 501 even after fastened by the screw 38, a portion of the inner surface of the front fixing member 501 has a concave or incision. As the curved portion 501b of the front fixing member 501 contacts the slanted portion 21b of the front support member 21, the front fixing member 501 is positioned in place relative to the main body housing 30 in the direction of Z axis.

With reference to FIGS. 9 through 12, a description is provided of fixation of the optical writer 5a (5b) at the rear board 32 side.

Figure 9:
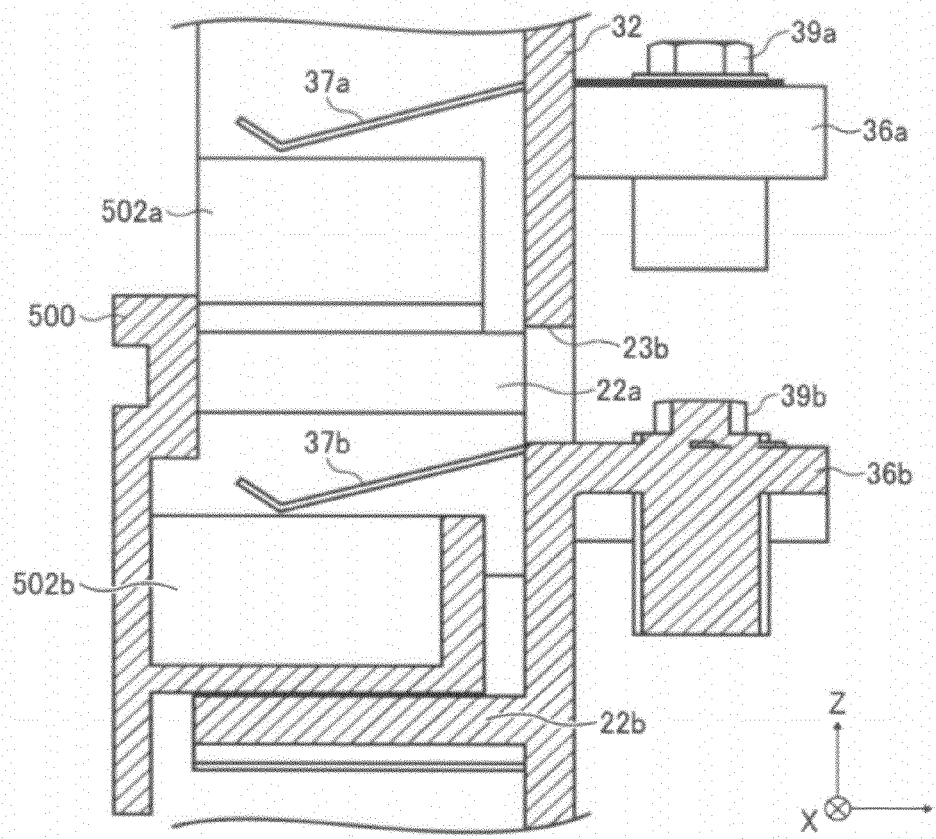
FIG. 9 is a cross-sectional diagram schematically illustrating rear fixing members of the optical housing and rear support members of the main body housing along a line T-T in FIG. 4.
Figure 10:
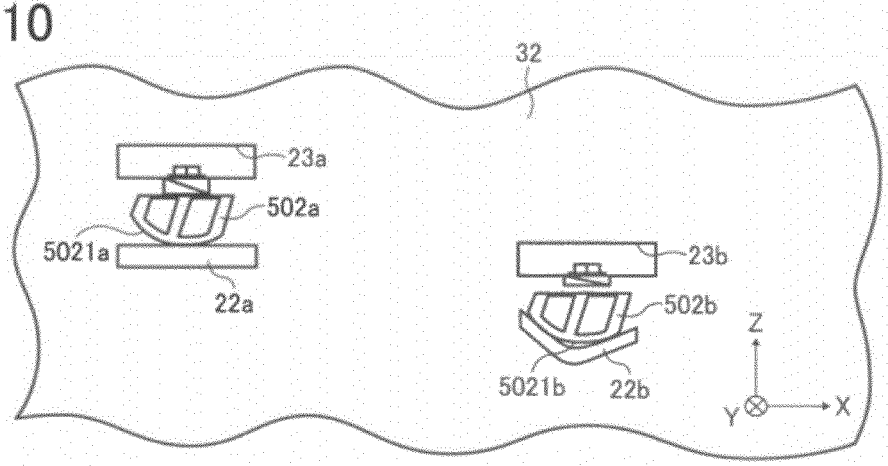
FIG. 10 is a cross-sectional diagram schematically illustrating the rear fixing members of the optical housing and the rear support members of the main body housing along a line U-U in FIG. 4.
Figure 11:
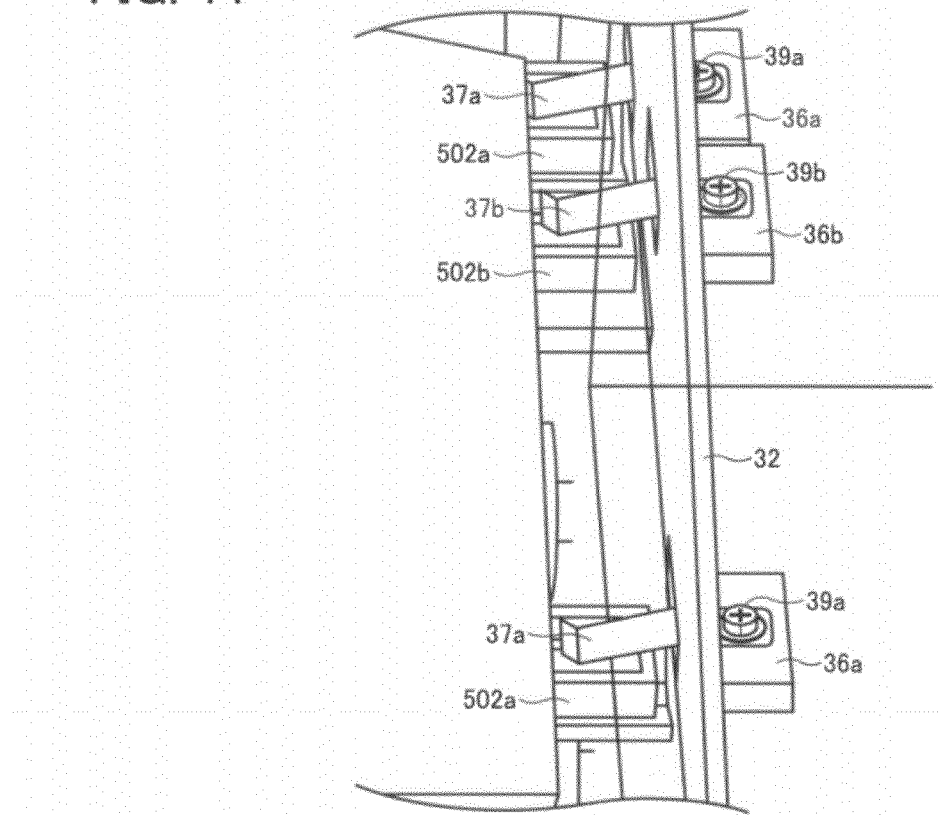
FIG. 11 is a perspective view schematically illustrating the rear side of the first optical writer attached to a wall of the main body housing of the image forming apparatus.
Figure 12:
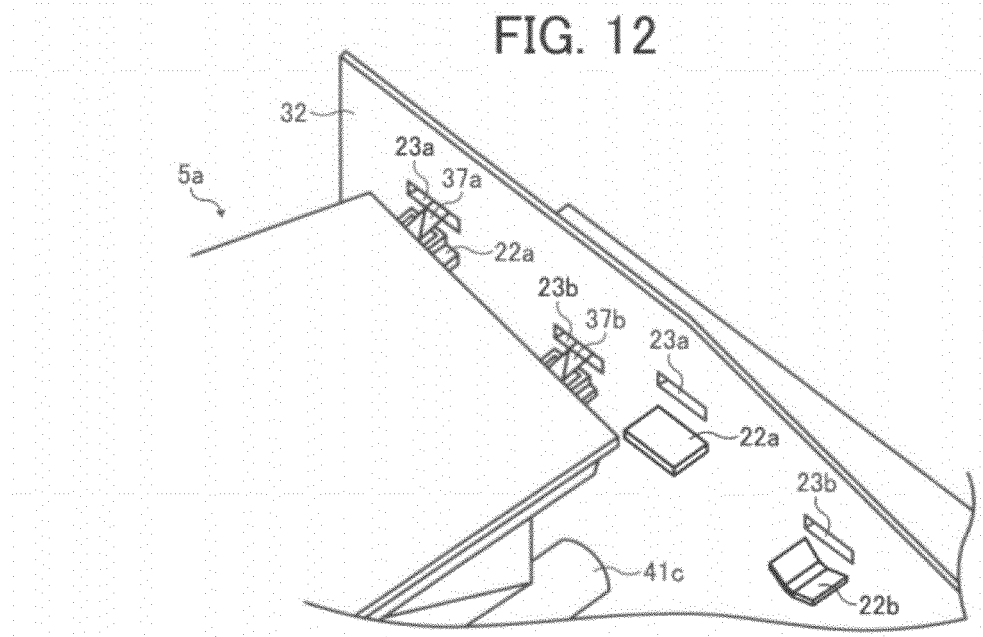
FIG. 12 is a perspective view schematically illustrating the rear side of the first optical writer attached to the wall of the main body housing of the image forming apparatus without a second optical writer.

FIG. 9 is a cross-sectional diagram schematically illustrating the optical housing 500 and the rear board 32 along a line T-T in FIG. 4. FIG. 10 is a cross-sectional diagram schematically illustrating the first and the second rear fixing members 502a and 502b of the optical housing 500, and the rear board 32 along a line U-U in FIG. 4. FIG. 11 is a perspective view schematically illustrating the first and the second rear fixing members 502a and 502b of the first optical writer 5a, and the rear board 32. FIG. 12 is a perspective view schematically illustrating the first and the second rear fixing members 502a and 502b of the first optical writer 5a, and the rear board 32 without the second optical writer 5b.

As illustrated in FIGS. 10 and 12, the rear board 32 facing the optical writer 5a includes a first rear support member 22a and a second rear support member 22b. The first rear support member 22a and the second rear support member 22b project from the rear board 32. According to an illustrative embodiment, the first rear fixing member 502a is supported by the first rear support member 22a. The second rear fixing member 502b is supported by the second rear support member 22b.

As illustrated in FIGS. 9 and 11, the rear board 32 at the side on which the driving unit 35 is attached includes mounts 36a and 36b to which the leaf springs 37a and 37b are fixed. As illustrated in FIG. 12, the rear board 32 includes rectangular through holes 23a and 23b through which the leaf springs 37a and 37b penetrate. More specifically, the through holes 23a and 23b are formed in the rear board 32 such that the tips of the leaf springs 37a and 37b attached to the mounts 36a and 36b face the first rear support member 22a and the second rear support member 22b.

The first and the second rear fixing members 502a and 502b have the same shape. More specifically, as illustrated in FIG. 10, bottom surfaces 5021a and 5021b of the rear fixing members 502a and 502b are curved downward, hence projecting downward.

As illustrated in FIG. 10, as the first rear fixing member 502a is placed on the first rear support member 22a, the curved bottom surface 5021a of the first rear fixing member 502a contacts a flat surface of the first support member 22a parallel to the direction of X axis (horizontal direction). With this configuration, the first rear fixing member 502a is positioned in place relative to the main body housing 30 in the direction of axis Z.

As the second rear fixing member 502b is placed on the second rear support member 22b, the curved bottom surface 5021b of the second rear fixing member 502b contacts two slanted surfaces of the second support member 22b. With this configuration, the second rear fixing portion 502b is positioned in place relative to the main body housing 30 in the directions of X axis and Z axis.

As the first and the second rear fixing members 502a and 502b are supported by the first and the second support members 22a and 22b, respectively, the leaf springs 37a and 37b are inserted into the through holes 23a and 23b of the rear board 32, and fastened to the mounts 36a and 36b by screws 39a and 39b, respectively, while the tips of the leaf springs 37a and 37b face the upper surfaces of the first and the second rear fixing members 502a and 502b. Accordingly, the first and the second rear fixing members 502a and 502b are biased towards the first and the second rear support members 22a and 22b. Furthermore, the first rear fixing member 502a is interposed and fixed between the leaf spring 37a and the rear support member 22a. The second rear fixing member 502b is interposed and fixed between the leaf spring 37b and the rear support member 22b.

According to the present illustrative embodiment, the second rear fixing member 502b and the front fixing member 501 are positioned in place in the direction of X axis, thereby positioning the optical writer 5 in place relative to the main body housing 30 in the direction of X axis and around the Z axis. As the front fixing member 501 and the rear fixing members 502a and 502b are positioned in place in the direction of Z axis, the optical writer 5 is positioned in place in the direction of Z axis, and around Y axis and X axis. As the front fixing member 501 is positioned in place relative to the main body housing 30 in the direction of Y axis, the optical writer 5 is positioned in place relative to the main body housing 30 in the direction of Y axis. With this configuration, the optical writer 5 is positioned in place relative to the main body housing 30 in the directions of X, Y, and Z axes, as well as around X, Y, and Z axes. Accordingly, a desired beam spot diameter of the light beam on the photoconductive drum can be achieved, and misalignment of the scan line on the photoconductive drum 41 is prevented.

The front fixing member 501 and the rear fixing members 502a and 502b are positioned in place and fixed inside the main body housing 30. With this configuration, the optical writer 5a (5b) can be removed from the main body housing 30 by removing the screw 38 and the leaf springs 37a and 37b, and taking the optical writer 5a (5b) upward. Accordingly, the optical writer 5a (5b) can be replaced with ease as needed.

Alternatively, if the front fixing member 501 contacts the slanted surface of the front support member 21 so that the optical writer 5a (5b) can be positioned in place relative to the main body housing 30 around the direction of Z axis, the second rear support member 22b can be made flat in the direction of X axis similar to the first rear support member 22a so that the second rear fixing member 502b is positioned in place in the direction of axis X.

It is to be noted that, preferably, the first rear fixing member 502a and the second rear fixing member 502b are placed at a distance from each other. With this configuration, in a case in which the position of the first rear fixing member 502a relative to the first rear support member 22a (the contact position of the first rear fixing member 502a and the first rear support member 22a) or the position of the second rear fixing member 502b relative to the second rear support member 22b (the contact position of the second rear fixing member 502b and the second rear support member 22b) deviates from the prescribed position in the direction of Z axis, the optical writer is prevented from tilting around the direction of Y axis when installed in the main body housing 30.

According to the present illustrative embodiment, the first and the second rear fixing members 502a and 502b are fixed to the main body housing 30 by the leaf springs 37. If the front fixing member 501, and the rear fixing members 502a and 502b are fixed to the main body housing 30 by screws directly, when the main body housing 30 deforms torsionally, the optical writer 5a (5b) deforms torsionally as well. In view of the above, According to the present illustrative embodiment, the first and the second rear fixing members 502a and 502b are fixed to the main body housing 30 using the leaf springs 37. With this configuration, even when the main body housing 30 deforms torsionally, the optical housing 500 pushes the leaf springs 37 up due to the stiffness of the optical housing 500 and separates from the rear support members 22a and 22b. Hence, the optical housing 500 does not deform together with the main body housing 30.

According to the present illustrative embodiment, when replacing the optical writer 5a (5b), the optical writer 5a (5b) can be removed from and attached to the image forming apparatus 100 by only unfastening and fastening the screw at one location. The installation of the optical writer 5a (5b) can be done within a short period of time. Accordingly, downtime, that is, a period of time during which the device is not operated, can be shortened as is usually desired.

According to the present illustrative embodiment, the optical writer 5a (5b) is fixed to the rear board 32 by the leaf springs 37 at the side at which the driving unit 35 is fixed. With this configuration, even when the driving unit 35 vibrates causing the rear board 32 to vibrate, the optical housing 500 is prevented from vibrating together with the rear board 32, thus preventing an imaging problem such as banding.

With reference again to FIG. 3, a detailed description is provided of the optical housing 500. FIG. 3 is a cross-sectional view schematically illustrating the optical housing 500 along a line A-A in FIG. 2. As illustrated in FIG. 3, the bottom surface of the optical housing 500 includes two curved portions in the shape of arc of a circle, that is, a first curved portion 503a and a second curved portion 503b. The first curved portion 503a is provided between the polygon scanner 53 and the opening 504BK covered by the dustproof glass 58BK. The second curved portion 503b is provided between the opening 504BK covered by the dustproof glass 58BK and the opening 504C covered by the dustproof glass 58C. The curved portions 503a and 503b on the bottom surface of the optical housing 500 can increase the stiffness of the bottom surface thereof, as described in detail below.

Figure 13A:
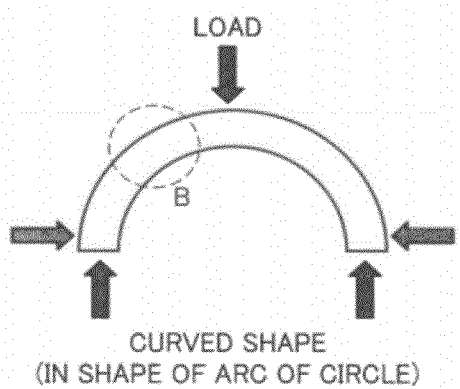
FIG. 13A shows a stress distribution of a beam in the shape of arc of a circle.
Figure 13A:
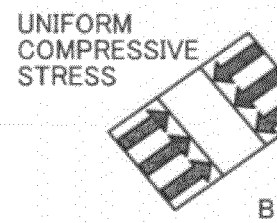
Figure 13B:
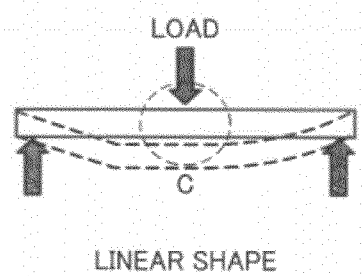
FIG. 13B shows a stress distribution of a linear beam.
Figure 13B:
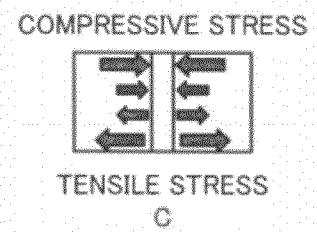

With reference to FIGS. 13A and 13B, a description is provided of a stress distribution of a beam in the shape of an arc of a circle as compared with that of a linear beam. FIG. 13A shows a stress distribution of a curved beam in the shape of arc of a circle. FIG. 13B shows a stress distribution of a linear beam.

As illustrated in FIG. 13B, when a load is applied to the linear beam, compressive stress is generated at the load receiving side (the upper side) of the beam, and tensile stress is generated at the bottom. As a result, the linear beam bends downward.

By contrast, as illustrated in FIG. 13A, when a load is applied to the curved beam, only substantially uniform compressive stress is generated inside the arc of a circle in cross section in the circumference direction. As a result, the curved beam hardly bends. As can be understood from FIGS. 13A and 13B, the curved portion in the shape of an arc of a circle provided at the bottom surface of the optical housing 500 can enhance stiffness of the bottom surface thereof.

However, if an opening is formed in the curved portion to attach the dustproof glass, the strength of the curved portion having the opening is reduced. As a result, buckling occurs from the opening of the curved portion, hence degrading stiffness of the bottom surface of the optical housing 500.

In view of the above, according to the present illustrative embodiment, the curved portion is provided between the openings of the bottom surface of the optical housing 500. In other words, the opening is not formed in the curved portion. With this configuration, buckling at the curved portion can be prevented, thereby enhancing stiffness of the bottom surface of the optical housing, when compared with forming the opening in the curved portion. Accordingly, vibration of the bottom surface of the optical housing 500 is suppressed, thereby preventing an imaging problem such as banding.

With reference to FIGS. 14A through 14C and FIGS. 15A through 15C, a description is provided of results of a structural analysis simulation for housings with different configurations, performed by inventors of the present invention.

Figure 14A:
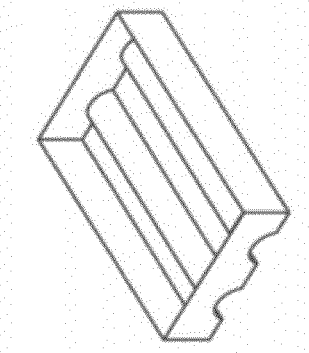
FIG. 14A is a perspective view of a box-shaped model having a planar bottom surface without ribs for a simulation performed by inventors of the present invention.
Figure 14B:
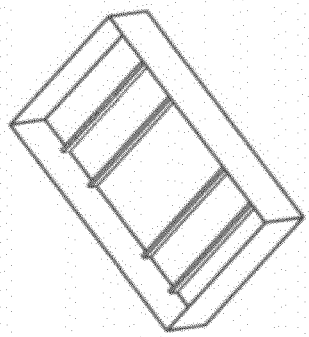
FIG. 14B is a perspective view of a box-shaped model with ribs provided to the bottom surface thereof.
Figure 14C:
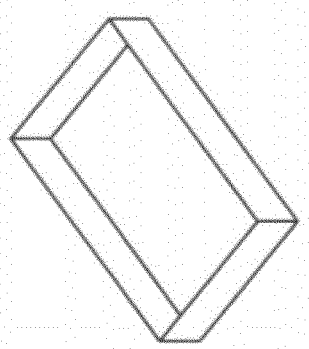
FIG. 14C is a perspective view of a box-shaped model with two curved portions on the bottom surface thereof.

FIG. 14A is a perspective view of a box-shaped model (assuming an optical housing) having a planar bottom surface without ribs. FIG. 14B is a perspective view of a box-shaped model with ribs on the bottom surface thereof. FIG. 14C is a perspective view of a box-shaped model with two curved portions on the bottom surface thereof, similar to the optical housing 500 of the present invention.

Figure 15A:
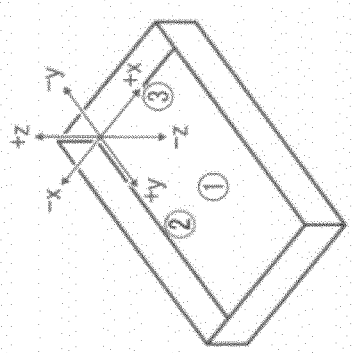
FIG. 15A shows a location of a stress point in the simulation.
Figure 15B:
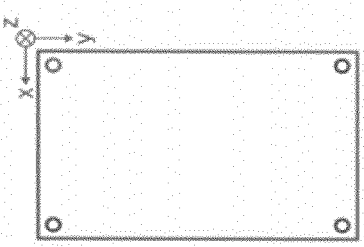
FIG. 15B shows fixing points of each model in the simulation.
Figure 15C:
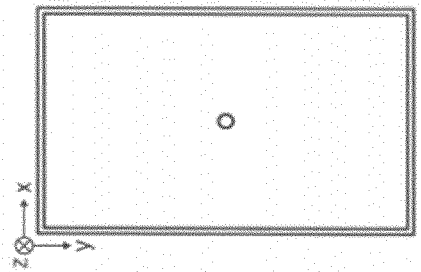
FIG. 15C shows measuring points in the simulation.

FIG. 15A through 15C illustrate conditions for the simulation. FIG. 15A shows the location of a stress point as being at the center of the model which tends to be bent easily. FIG. 15B shows fixing points. As shown in FIG. 15B, each model is fixed at four corners. FIG. 15C shows measuring points. The stress applied to the stress point shown in FIG. 15A had a diameter of 10 mm and a stress of 20N. Each of the fixing points had a diameter of 10 mm and was disposed 12 mm from the end portion as shown in FIG. 15B. The external dimensions of each model was: 160 mm (in the direction of X axis)×248 mm (in the direction of Y axis)×45 mm (in the direction of Z axis).

As illustrated in FIG. 15C, displacement was measured at three points. In FIG. 15C, coordinate 1 was: X=80, Y=124, and Z=0 (center of weight). Coordinate 2 was: X=15, Y=124, and Z=0. Coordinate 3 was: X=80, Y=15, and Z=0.

TABLE 1 shows results of the structural analysis simulation for the box-shaped housing (assuming the optical housing) having a planar bottom surface without ribs as illustrated in FIG. 14A. TABLE 2 shows results of the structural analysis simulation for the box-shaped housing with ribs on the bottom surface thereof as illustrated in FIG. 14B. TABLE 3 shows results of the structural analysis simulation for the box-shaped housing with two curved portions on the bottom surface thereof as illustrated in FIG. 14C.

TABLE 1

(Without ribs)

| COORDINATE | Z-AXIS (mm) |
| --- | --- |
| 1 | −0.5499 |
| 2 | −0.1123 |
| 3 | −0.0259 |

TABLE 2

(With ribs)

| COORDINATE | Z-AXIS (mm) |
|---|---|
| 1 | −0.3647 |
| 2 | −0.0738 |
| 3 | −0.0095 |

TABLE 3

(With curved portions)

| COORDINATE | Z-AXIS (mm) |
|---|---|
| 1 | −0.0496 |
| 2 | −0.0107 |
| 3 | −0.0072 |

As shown in TABLE 1, an amount of displacement of the box-shaped housing with two curved portions at the bottom surface as illustrated in FIG. 14C was the smallest among all housings. Therefore, it is clear that the box-shaped housing with two curved portions can suppress deformation of the surface as compared with other box-shaped housings, thus suppressing vibration of the bottom surface of the housing.

As described above, when the polygon mirror 53a rotates fast, the polygon scanner 53 vibrates. Due to its vibration, the optical housing 500 as a whole vibrates as well, causing the reflective mirrors 55 and 56 to vibrate undesirably. This leads to displacement of the optical elements and results in degradation of imaging quality. In view of the above, the polygon scanner 53 may be disposed in a housing different from the housing for holding the reflective mirrors. However, such a configuration increases the number of constituent parts.

According to the present illustrative embodiment, the polygon scanner 53, which is the source of vibration, is disposed at one side of the optical housing 500. As compared with disposing the polygon scanner in the center of the optical housing where deformation easily occurs as in a counter-scanning type optical writer, the optical housing 500 disposed at one side can suppress vibration. When disposing the polygon scanner 53 at one side of the housing, even when the polygon scanner 53 and the reflective mirrors are disposed in the same optical housing, vibration of the reflective mirrors 55 and 56 can be suppressed without having the polygon scanner 53 and the reflective mirrors 55 and 56 disposed in different housings. Therefore, the number of constituent parts can be reduced.

As illustrated in FIG. 3, the optical parts beyond the scanning lens 54 in the direction opposite the polygon scanner 53, that is, the reflective mirrors 55C, 55BK, and 56BK, and the cylindrical lenses 57C and 57BK, are disposed beyond the first curved portion 503a relative to the polygon scanner 53. With this configuration, even when vibration of the polygon scanner 53 shakes the bottom surface of the optical housing 500 near the polygon scanner 53, the vibration is prevented from getting transmitted to the optical parts after the scanning lens 54 in the optical housing 500. Accordingly, vibration of the optical parts (i.e. the reflective mirrors and the cylindrical lens) beyond the scanning lens can be suppressed.

Referring back to FIG. 5, as viewed along the direction of Y axis, the curved surface 501b of the front fixing member 501 that contacts the front support member 21 is disposed within a curved area R of the second curved portion 503b. The curved portion 503b has high stiffness. Thus, when the curved surface 501b of the front fixing member 501 is disposed at the curved area R, the stiffness of the front fixing member 501 can be enhanced.

Figure 16:
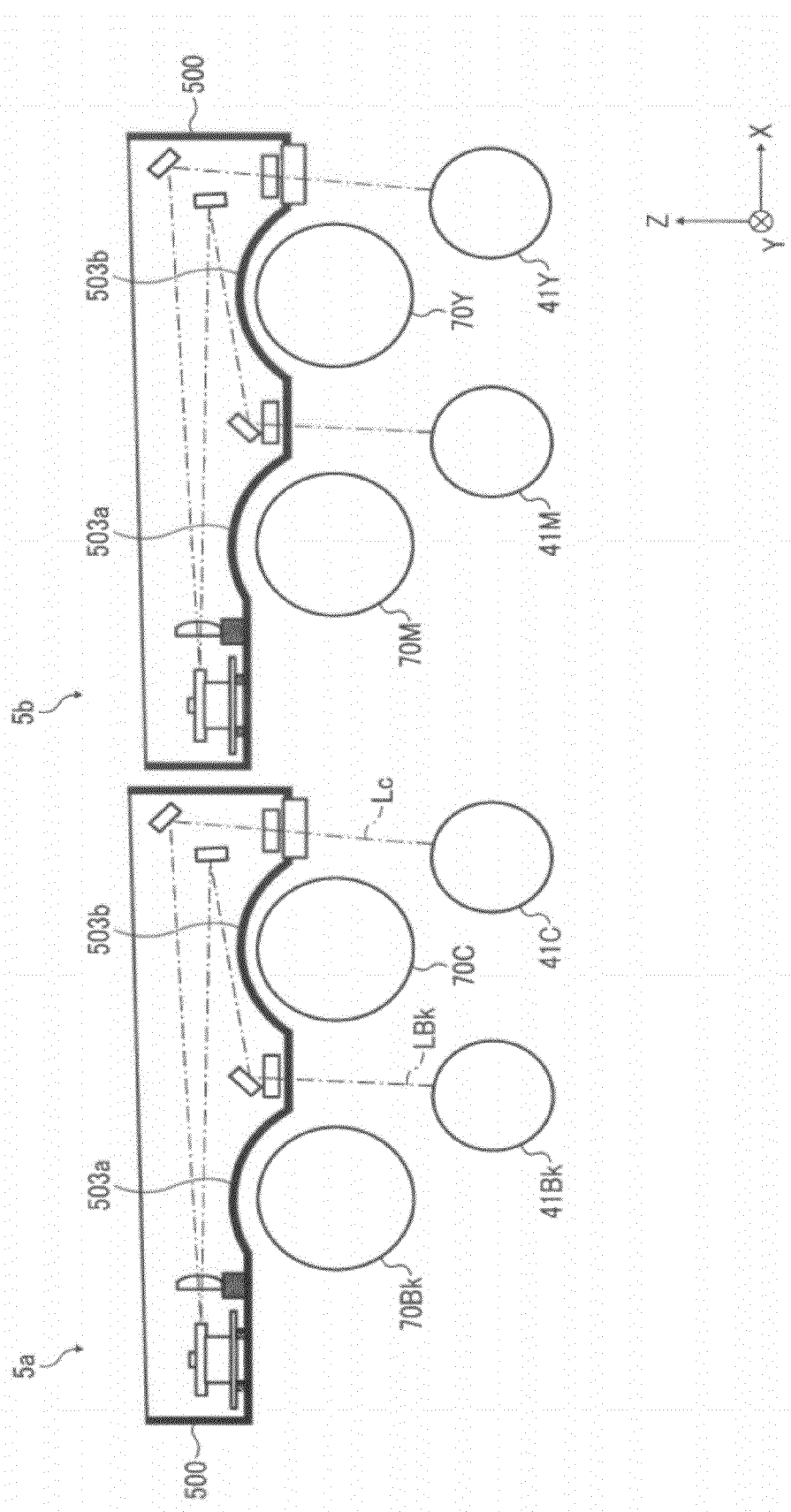
FIG. 16 is a schematic diagram illustrating toner bottles disposed opposite the first and a second optical writers.

According to the present illustrative embodiment, the curved portions 503a and 503b provide some space between the image forming units 4Y, 4C, 4M, and 4BK, and the curved portions 503a and 503b. Thus, as illustrated in FIG. 16, toner bottles 70Y, 70M, 70C, and 70BK may be disposed opposite the first and the second curved portions 503a and 503b to supply toner of respective colors to the developing devices 43Y, 43M, 43C, and 43BK. FIG. 16 is a schematic diagram illustrating the first and the second optical writers 5a and 5b, and the toner bottles 70Y, 70M, 70C, and 70BK.

As illustrated in FIG. 16, the toner bottle 70BK storing black toner is disposed facing the first curved portion 503a of the first optical writer 5a. The toner bottle 70C storing toner of cyan is disposed facing the second curved portion 53b. The toner bottle 70M storing toner of magenta is disposed facing the first curved portion 503a of the second optical writer 5b. The toner bottle 70Y storing the toner of yellow is disposed facing the second curved portion 503b. The toner bottles 70Y, 70M, 70C, and 70BK all have a cylindrical shape that conforms to the curvature of the curved portions 503a and 503b, and a portion of the toner bottles 70 overlaps with the optical housing 500. That is, when the optical writer is viewed along the axial direction of the photoconductive drum 41 (the direction of Y axis), a portion of the toner bottles 70 overlaps with the optical housing 500. With this configuration, compact configuration of the optical writer can be achieved.

Figure 17:
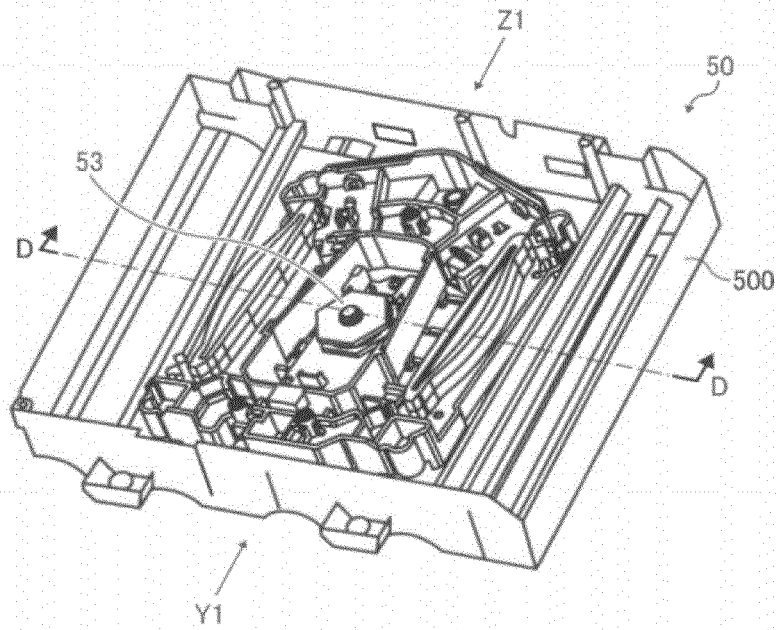
FIG. 17 is a perspective view schematically illustrating an optical writer according to another illustrative embodiment of the present invention.
Figure 18:
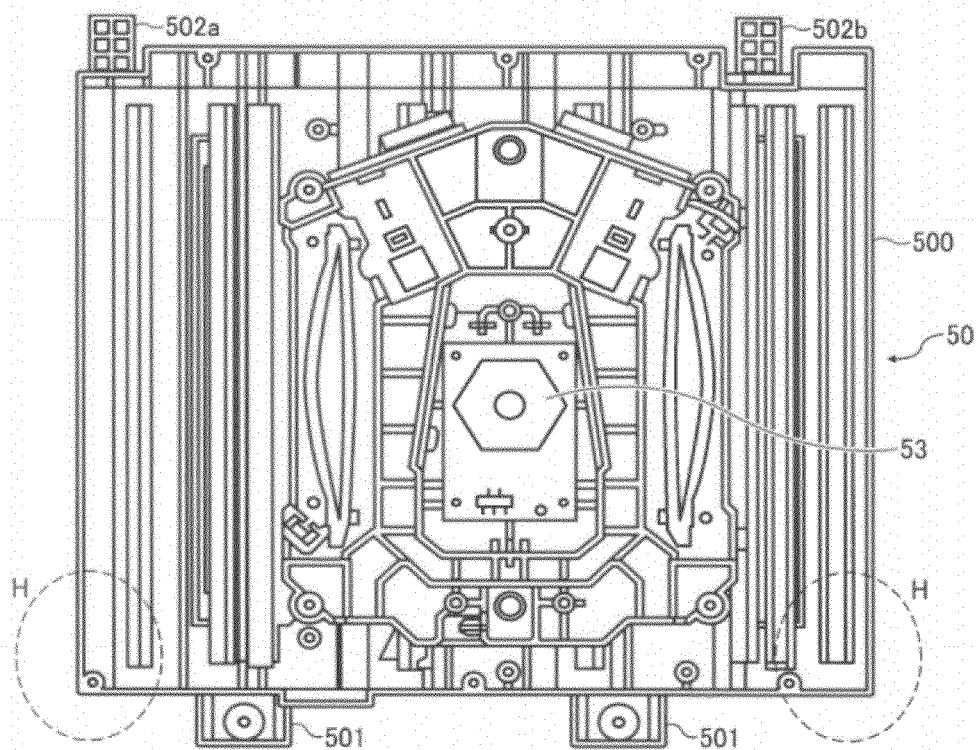
FIG. 18 is a top view schematically illustrating the optical writer of FIG. 17.
Figure 19:
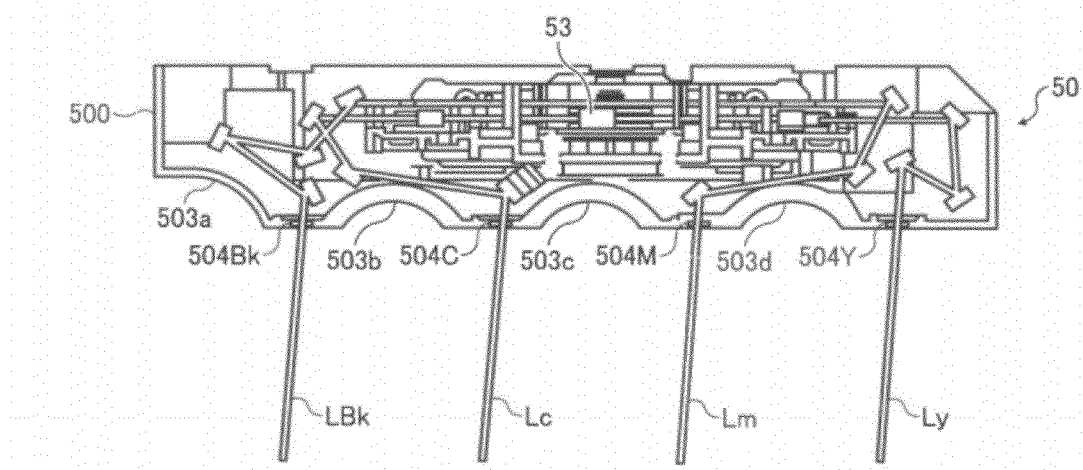
FIG. 19 is a cross-sectional view schematically illustrating the optical writer along a line D-D in FIG. 17.
Figure 20:
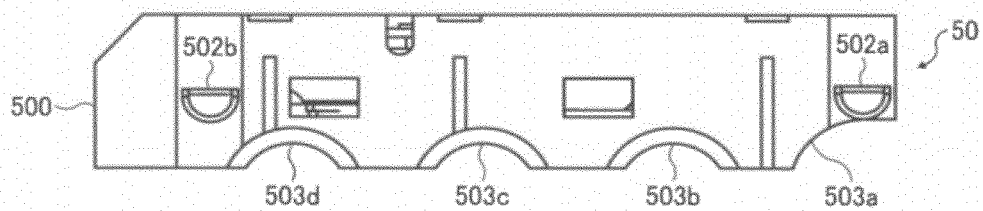
FIG. 20 is a schematic diagram illustrating the optical writer as viewed from Z1 in FIG. 17.
Figure 21:
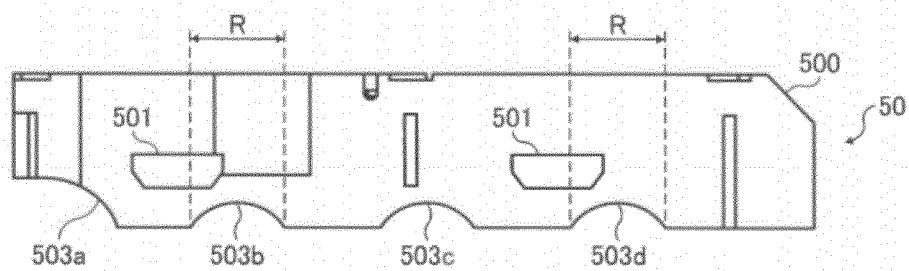
FIG. 21 is a schematic diagram illustrating the optical writer as viewed from Y1 in FIG. 17.

With reference to FIGS. 17 through 21, a description is provided of an optical writer according to another illustrative embodiment. FIG. 17 is a perspective view schematically illustrating an optical writer 50 according to another illustrative embodiment of the present invention. FIG. 18 is a top view schematically illustrating the optical writer 50. It is to be noted that the same reference numerals used in the foregoing embodiments are provided to the similar or the same constituent elements in FIGS. 17 through 21 when discrimination therebetween is not required. FIG. 19 is a cross-sectional view schematically illustrating the optical writer 50 along a line D-D in FIG. 17. FIG. 20 is a schematic diagram illustrating the optical writer 50 as viewed from Z1 in FIG. 17. FIG. 21 is a schematic diagram illustrating the optical writer 50 as viewed from Y1 in FIG. 17.

As illustrated in FIG. 17, the polygon scanner 53 is disposed substantially in the center of the optical housing 500 of the optical writer 50. The optical writer 50 is a counter-scanning type optical writer that scans the photoconductive drums 41Y, 41M, 41C, and 41Y. Similar to the foregoing embodiment, the optical housing 500 includes the curved portions on the bottom surface thereof. As illustrated in FIG. 19, the optical housing 500 includes the first curved portion 503a at the left of the opening 504BK through which the scan light for black passes, and the second curved portion 503b between the opening 504BK and the opening 504C through which the scan light for cyan passes.

According to the present embodiment, the optical housing 500 includes a third curved portion 503c and a fourth curved portion 503d. A third curved portion 503c is provided between the opening 504C and an opening 504M through which the scan light for magenta passes. A fourth curved portion 503d is provided between the opening 504M and the opening 504Y through which the scan light for yellow passes. In the counter-scanning type optical writer, the openings are formed in the bottom surface of the optical housing 500, other than where the curved portions are formed. With this configuration, the stiffness of the optical housing 500 can be increased by the curved portions, thereby suppressing vibration of the optical housing 500.

According to the present embodiment, the optical writer 50 scans four photoconductive drums 41Y, 41M, 41C, and 41BK so that the distance in the horizontal direction (the direction of X axis) is approximately twice as much as the foregoing embodiment. As compared with the foregoing embodiment, the number of constituent parts in the optical housing increases, thereby increasing the weight of the optical writer. Similar to the foregoing embodiment, if one front fixing member for fixing the optical housing is provided at the center of the wall of the optical housing facing the front board of the main body housing, each end portion of the front wall of the optical housing indicated by a dotted circle H as illustrated in FIG. 18 may bend under its own weight.

In view of the above, according to the present embodiment, the optical writer 50 includes two front fixing members 501 provided to the wall of the optical housing facing the front board of the main body housing, similar to the rear side of the optical housing. In this configuration, the front side of the optical writer 50 is positioned in place and fixed at two points, similar to the rear side thereof. As illustrated in FIG. 21, a portion of each of the front fixing members 501 of the optical writer 50 is disposed within the curved area R, thereby enhancing the stiffness of the front fixing members 501.

According to the illustrative embodiments described above, one of the surfaces of the optical housing with openings through which scan light passes includes a curved portion in the shape of arc of a circle. The openings are formed at a place without the curved portion. With this configuration, the stiffness of the curved portion can be enhanced and vibration can be suppressed, as compared with the known optical housing in which the opening is formed in the curved portion.

According to the illustrative embodiments, the plurality of the optical elements such as the cylindrical lens and the reflective mirrors and are disposed at a distance from the deflector, i.e. the polygon scanner, via the curved portion.

With this configuration, even when vibration of the polygon scanner shakes the optical housing near the polygon scanner, the curved portion prevents the vibration from transmitting, thereby preventing vibration of the optical elements. Drifting of the scan line that scans the surface of the photoconductive drum towards the main scanning direction and the sub-scanning direction is prevented.

According to the illustrative embodiments, the deflector, that is, the polygon scanner is disposed near the end portion of the optical housing.

Because the polygon scanner that may be the source of vibration is disposed near the end of the optical housing, vibration of the optical housing is reduced if not prevented entirely, as compared with the polygon scanner disposed in the center of the optical housing.

According to the illustrative embodiment, the optical writer includes a plurality of light sources. Light fluxes projected from the light sources illuminate the surfaces of photoconductive drums through different openings of the optical housing. The curved portion is formed between the openings.

The plurality of light sources are arranged in the sub-scanning direction such that the light fluxes projected from the light sources strike the same position of the deflector, the polygon scanner.

With this configuration, the length of the polygon mirror in the sub-scanning direction is shortened, thereby making the image forming apparatus as a whole as compact as is usually desired. The number of constituent parts can be reduced as compared with the known optical writer in which the polygon mirror is provided for each light source arranged in the sub-scanning direction.

According to the illustrative embodiments, the cylindrical toner bottles storing toner are disposed opposite the curved portions of the optical housing such that a portion of the toner bottles overlaps with the optical housing so that downsizing of the image forming apparatus as a whole can be achieved.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical writer, comprising:
 a housing including a plurality of surfaces, one of said plurality of surfaces includes a substantially flat portion having an opening formed therein, a curved portion curved in the shape of an arc of a circle in cross-section, and a deflector mount;
 a light source enclosed within the housing to project light through the opening and onto a target;
 a deflector enclosed within the housing and mounted on the deflector mount to deflect the light projected from the light source in a main scanning direction; and
 a plurality of optical elements enclosed within the housing to direct the light deflected by the deflector onto the target,
 wherein an exterior of a bottom surface of the housing comprises at least one of the substantially flat portion and the curved portion.

2. The optical writer according to claim 1, wherein the plurality of optical elements includes a focusing lens disposed opposite the deflector with the curved portion of the housing interposed therebetween, to focus the light in a sub-scanning direction which is a direction perpendicular to the main scanning direction.

3. The optical writer according to claim 1, wherein the plurality of optical elements includes a reflective mirror disposed opposite the deflector with the curved portion of the housing interposed therebetween, to reflect the light.

4. The optical writer according to claim 1, wherein the deflector is disposed near one end portion of the housing inside the housing.

5. The optical writer according to claim 1, further comprising:
 a plurality of openings formed in one of the surfaces of the housing including the curved portion;
 a plurality of light sources enclosed within the housing to project light against different targets via different openings,
 wherein the curved portion is disposed between the openings.

6. The optical writer according to claim 5, wherein the plurality of light sources are arranged in the sub-scanning direction in the housing such that the light projected from the plurality of light sources strikes the same position on the deflector.

7. An image forming apparatus, comprising:
a plurality of latent image bearing members to bear latent images;
the optical writer of claim 5 to illuminate the surfaces of the latent image bearing members with light to form the latent images on the surfaces thereof; and
a plurality of developing devices to develop the latent images with a respective developer to form visible images.

8. An image forming apparatus, comprising:
a latent image bearing member to bear a latent image;
the optical writer of claim 1 to illuminate a surface of the latent image bearing member with light to form the latent image on the surface thereof; and
a developing device to develop the latent image with a developer to form a visible image.

9. The image forming apparatus, according to claim 8, further comprising:
a cylindrical container disposed opposite the curved portion of the housing of the optical writer, to store the developer to develop the latent image,
wherein a portion of the container overlaps the housing,
wherein the developer is in powder form.

10. The optical writer according to claim 1, wherein:
said one of said plurality of surfaces includes a plurality of curved portions, and
the opening is formed between the plurality of curved portions.

11. The optical writer according to claim 1, wherein:
the exterior of the bottom surface of the housing comprises both the substantially flat portion and the curved portion.

12. The optical writer according to claim 1, wherein:
the exterior of the bottom surface of the housing comprises the substantially flat portion.

13. The optical writer according to claim 1, wherein:
the exterior of the bottom surface of the housing comprises the curved portion.

14. The optical writer according to claim 13, wherein:
the housing is molded into one piece and comprises the bottom surface and four sides.

15. The optical writer according to claim 1, wherein:
the housing is molded into one piece and comprises the bottom surface and four sides.

16. The optical writer according to claim 1, wherein:
the exterior of the bottom surface of the housing comprises the curved portion and the curved portion curves upwardly from a bottom of the housing towards an interior of the housing in a direction parallel to an axis of rotation of the deflector.

\* \* \* \* \*